United States Patent
Alvarez

(10) Patent No.: US 11,192,790 B2
(45) Date of Patent: Dec. 7, 2021

(54) APPARATUS, SYSTEM AND METHOD FOR CONVERSION OF ATMOSPHERIC CARBON DIOXIDE TO GRAPHENE

(71) Applicant: Leandro Alvarez, Miami, FL (US)

(72) Inventor: Leandro Alvarez, Miami, FL (US)

( * ) Notice: Subject to any disclaimer, the term of this patent is extended or adjusted under 35 U.S.C. 154(b) by 270 days.

(21) Appl. No.: 16/435,560

(22) Filed: Jun. 10, 2019

(65) Prior Publication Data

US 2019/0375640 A1    Dec. 12, 2019

Related U.S. Application Data

(60) Provisional application No. 62/683,015, filed on Jun. 11, 2018.

(51) Int. Cl.
  *C01B 32/19*     (2017.01)
  *B82Y 40/00*     (2011.01)

(52) U.S. Cl.
  CPC .............. *C01B 32/19* (2017.08); *B82Y 40/00* (2013.01); *C01B 2204/00* (2013.01); *Y02P 20/151* (2015.11)

(58) Field of Classification Search
  CPC ...... C01B 32/19; C01B 32/194; C01B 32/196
  See application file for complete search history.

(56) References Cited

PUBLICATIONS

Chakrabarti, Amartya, et al. "Conversion of carbon dioxide to few-layer graphene." Journal of Materials Chemistry 21.26 (2011): 9491-9493.*

Xing, Zhenyu, et al. "Reducing CO2 to dense nanoporous graphene by Mg/Zn for high power electrochemical capacitors." Nano Energy 11 (2015): 600-610.*

Gu, Si-Yong, et al. "Amino-functionalization of graphene nanosheets by electrochemical exfoliation technique." Diamond and Related Materials 87 (2018): 99-106.*

Wu, Weiming, Changsong Zhang, and Shaogang Hou. "Electrochemical exfoliation of graphene and graphene-analogous 2D nanosheets." Journal of Materials Science 52.18 (2017): 10649-10660.*

(Continued)

*Primary Examiner* — Richard M Rump
(74) *Attorney, Agent, or Firm* — Allen F. Bennett; Bennett Intellectual Property

(57) ABSTRACT

A method for synthesizing graphene sheets from carbon dioxide gas comprises percolating a gaseous carbon dioxide solution through an aqueous monoethanolamine solution at a low temperature, heating the aqueous monoethanolamine solution to release absorbed carbon dioxide, collecting the released carbon dioxide in a carbon dioxide collection chamber having magnesium metal element. The magnesium metal elements are ignited in the presence of carbon dioxide to form magnesium oxide and graphene flakes. The graphene flakes and magnesium oxide are washed with an aqueous hydrochloric acid solution to form magnesium chloride, water and graphene flakes, which are then separated. The graphene flakes are then exfoliated in an ammonium sulfate solution, separated from the ammonium sulfate solution, and tumbled in a tumble blender for several hours. Finally, graphene sheets are grown from the exfoliated flakes by immersing them in ethanol and applying a current. The graphene sheets are then separated from the ethanol and used in a variety of applications.

8 Claims, 2 Drawing Sheets

(56) References Cited

PUBLICATIONS $CO_2$ capture using monoethanolamine solutions: Development and validation of a process model based on the SAFT-VR equation of state. Brand, Charles, Centre for Process Systems Engineering Department of Chemical Engineering Imperial College London United Kingdom, May 2013.

Carbon Dioxide Capture by Chemical Absorption: A Solvent Comparison Study, Kothandaraman, Anusha, Doctor of Philosophy in Chemical Engineering Practice at the Massachusetts Institute of Technology, Jun. 2010.

* cited by examiner

APPARATUS, SYSTEM AND METHOD FOR CONVERSION OF ATMOSPHERIC CARBON DIOXIDE TO GRAPHENE

CROSS-REFERENCE TO RELATED APPLICATIONS

This application claims priority to U.S. Provisional Application Ser. No. 62/683,015 filed on Jun. 11, 2018, the contents of which are hereby incorporated in their entirety.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable

INCORPORATION-BY-REFERENCE OF THE MATERIAL SUBMITTED ON A COMPACT DISC

Not Applicable.

COPYRIGHT NOTICE

Not Applicable

BACKGROUND OF THE INVENTION

Field of the Invention

The present invention relates to a method of graphene production through the ignition of magnesium and carbon dioxide sequestered from air, and then refined into an aqueous suspension of exfoliated graphene.

Description of the Related Art

A growing problem today is the increasing level of carbon dioxide in our atmosphere. As a greenhouse gas, it traps heat within our atmosphere, raising the average temperature of the planet, resulting in melting ice caps, warmer oceans, more acidic oceans, more severe weather, the destruction of various habitats and growing imbalance in almost every ecological system studied so far. These are only some of the known consequences, it is likely that there are additional consequences not yet identified. Efforts to slow production of carbon dioxide throughout many industries have been met with strong resistance and have not substantially impacted the ever increasing production of carbon dioxide. There has thus recently been increased interest in methods of removing carbon dioxide rather than reducing its production. Ideally, carbon dioxide could be removed from the atmosphere while simultaneously producing desirable compounds.

One particularly desirable compound is graphene. Graphene is a one atom thick, honey comb shaped molecule of carbon. Existing research shows that what makes to molecule so valuable is that it has high electrical conductivity, high flexibility, high strength, low weight, high electrical resistivity under certain conditions, high thermal insulation, a high capacity for heat absorption and storage, water filtration efficiency, and ability to absorb radiation.

In relation to the manufacture of graphene, one known production method is the exfoliation of graphite. A sample of standard graphite is treated by one or more methods such as sonication, vibration, and/or electric exfoliation, to tear apart the graphite into small graphene flakes. One known problem with this method is that the graphene produced through this method is lower quality than pure graphene. This is due to the fact that the produced flakes have scattered free radicals in its molecular structure, caused from being ripped apart from the original graphite molecule. Another problem with this production method is that the produced graphene sheets are usually small in size, and have limited use.

Another known production method of graphene is graphene oxide reduction, usually through a electrolytic methods. This involves mixing a molecule similar to graphene, e.g. graphene oxide, in an aqueous solution with a catalyst. The solution is then subject to an electrical current which removes the oxides from the graphene oxide, and what remains is graphene. One major problem with this production method is that usually, highly corrosive acids are involved, and similar to graphite exfoliation, the structural integrity of the graphene flakes are compromised, and the graphene sheets are usually small in size.

Another production method is known as nanotube slicing. Carbon nanotubes are in principle, essentially graphene sheets that have been rolled into a tube shape, and bounded at the ends. This method uses strong, highly accurate lasers to slice carbon nanotubes on one end and stretch out into single layer graphene. The main problem with this method is that carbon nanotubes are equally difficult to manufacture as graphene sheets, and highly expensive. Also, carbon nanotube size is difficult to control, and thus flake sizes for graphene are directly dependent on premanufactured nanotube sizes.

Another production method is known as chemical vapor deposition. This method involves superheating an aqueous solution of exfoliated graphite, water, and a catalyst into a vapor. The gaseous solution is applied to a rotation metal rod via air pressure. The metal rod usually has a strong electrical current running through it, which triggers the catalyst into binding the graphene sheets together into larger structures. Though the graphene sheets produced using this method has some of the highest quality in the market, the system is not without some inherent issues. This method requires very expensive equipment, and high maintenance demand. Also, the current known yield for this method is about a square inch a day, or about a few pounds of graphene a year.

In view of the foregoing, it is desirable to provide systems and methods for converting atmospheric carbon dioxide into graphene.

BRIEF SUMMARY OF THE INVENTION

Disclosed are devices, systems and methods for synthesizing graphene from carbon dioxide found in ambient air, flu gas, exhaust systems or the like.

In one embodiment, a method for synthesizing graphene sheets from carbon dioxide gas comprises percolating a gaseous carbon dioxide solution through an aqueous monoethanolamine solution at a low temperature, heating the aqueous monoethanolamine solution to release absorbed carbon dioxide, collecting the released carbon dioxide in a carbon dioxide collection chamber having magnesium metal element. The magnesium metal elements are ignited in the presence of carbon dioxide to form magnesium oxide and graphene flakes. The graphene flakes and magnesium oxide are washed with an aqueous hydrochloric acid solution to form magnesium chloride, water and graphene flakes, which are then separated. The graphene flakes are then exfoliated in an ammonium sulfate solution using either mechanical vibration or sonication, and separated from the ammonium sulfate solution. Finally, graphene sheets are grown from the exfoliated flakes by immersing them in ethanol and applying a current. The graphene sheets are then separated from the ethanol and used in a variety of applications.

In another embodiment, a method for synthesizing graphene sheets from carbon dioxide gas comprises pumping atmospheric air through a two part cooling system. The first part cools the air to a temperature of −10° C. This temperature removes water vapor and pollutants from the air. The second part, cools air to −78.5° C. At this temperature, ambient carbon dioxide gas is directly converted into a solid form. The solid carbon dioxide is allowed to sublimate, a process where the solid carbon dioxide changed physical state into a gas directly.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE SEVERAL VIEWS OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
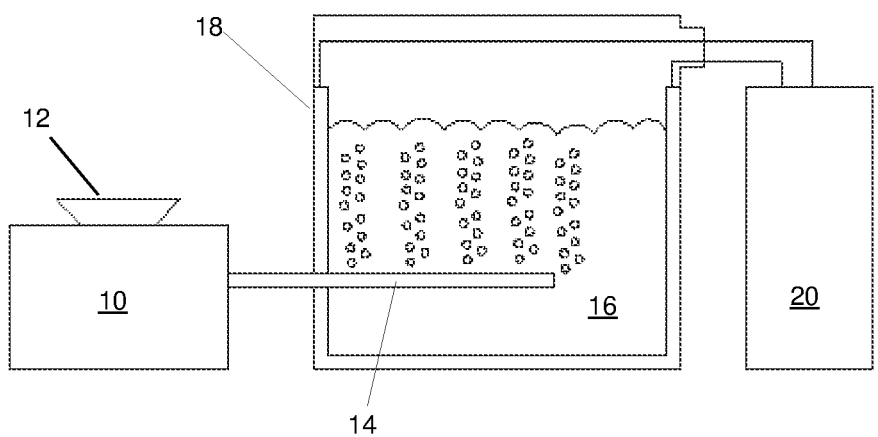
FIG. 1 is a cross-sectional view of a carbon dioxide capturing device in accordance with the principles of the invention.

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

In relation to existing and emerging technologies and processes, a new method of the production of the nanomolecule known as graphene begins with sequestering atmospheric carbon dioxide from air. The carbon dioxide is ignited with magnesium to create unexfoliated graphene flakes. Once separated from byproducts, these flakes are exfoliated in an aqueous ammonium sulfate solution in a vibration chamber. The exfoliated graphene flakes are then bound together using the self-repairing properties of the molecule placed in a container of ethanol with an electric current passing through it.

In some embodiments, the containers may be cylindrical or squared in order to facilitate visualization. The actual shape of the containers does not influence the process/invention and should not be interpreted as limiting the design.

The method of graphene production from atmospheric carbon dioxide, and its related applications begins by capturing atmospheric carbon dioxide. One method of capturing the carbon dioxide is to pump air through cold monoethanolamine. Once saturated with carbon dioxide, the monoethanolamine is heated to release the carbon dioxide into a collection chamber.

Magnesium is then ignited in the presence of the captured carbon dioxide collection chamber to produce unexfoliated graphene flakes, other forms of carbon and magnesium oxide. The unexfoliated graphene flakes than separated from the other products. Separation may be performed by suction filtration. The products of the ignition reaction our first immersed aqueous hydrochloric acid and placed in a suction filtration device and subsequently rinsed with deionized water. This removes magnesium oxide from the graphing and other carbon products.

The graphene flakes are then exfoliated by suspending the graphing flakes in a vat of aqueous ammonium sulfate by applying a current to the solution. Next, the exfoliated graphene is separated from the ammonium sulfate by suction filtration. The dry graphing flakes are further exfoliated by placing them in a tumble blender. The exfoliated graphene flakes are then grown into larger flakes by suspending them in ethanol and applying an electric current. The graphene sheets are then separated from the ethanol by suction filtration once a desirable size for the graphene sheets is achieved. These larger graphene sheets can be integrated into a wide variety of products and processes.

FIG. 1 shows one embodiment of the initial step of capturing atmospheric carbon dioxide. An air pump 10 receives air from the atmosphere through an air intake 12 and pumps it into an aerator 14. The aerator 14 introduces air bubbles into a monoethanolamine solution 16 in a capture chamber 18, which absorbs the carbon dioxide. In this embodiment, the monoethanolamine solution 16 is about 30% methanolamine. Optionally, other solutions known in the art to absorb carbon dioxide, for example deionized water, may be used. In addition, a skilled artisan will appreciate that there are a variety of other suitable methods for capturing carbon dioxide. The monoethanolamine solution 16 in this embodiment is an aqueous solution and may optionally include buffers or other chemical compositions that facilitate and maximize efficient absorption of carbon dioxide into the monoethanolamine solution 16. Those skilled in the art will appreciate that absorption of carbon dioxide by a monoethanolamine solution 22 includes the formation of various compounds which will of course be present in the solution also. During the step of absorbing carbon dioxide, the monoethanolamine solution 16 is kept at a relatively low temperature, such as for example below 10° C., below −50° C., or below −80° C. Optionally, the carbon dioxide capture chamber 18 may be pressurized in order to increase carbon dioxide solubility.

Once the monoethanolamine solution 16 becomes saturated with carbon dioxide, the monoethanolamine solution 16 is then heated to release carbon dioxide gas. In this embodiment, the monoethanolamine solution 16 is heated to about 35° C. Optionally, suction or negative pressure may also be applied to facilitate the release of gaseous carbon dioxide from the solution 16. The carbon dioxide gas is collected and stored within a carbon dioxide collection chamber 20.

Figure 2:
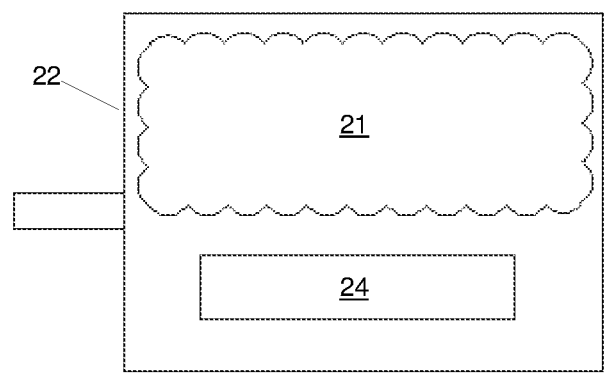
FIG. 2 is a cross-sectional view of an ignition chamber in accordance with the principles of the invention.

The collected carbon dioxide 21 is transferred to an ignition chamber 22, shown in FIG. 2, having a magnesium element 24. In this embodiment, the magnesium element 24 is a strip of thin foil.

The magnesium elements 24 may be substantially pure magnesium or a magnesium alloy such as a magnesium aluminum alloy. The magnesium element 24 is ignited, producing graphene and other carbon compounds according to the following redox reaction:

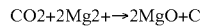

$$CO2+2Mg2+ \rightarrow 2MgO+C$$

The products of this reaction are solids. C refers to various carbon compounds, such as for example graphene, fullerenes, nanotubes, amorphous carbon and the like. It is generally preferable to perform the above reaction at an elevated temperature to ensure that substantially all of the carbon has been sufficiently reduced. The solid reaction products are washed with hydrochloric acid, which reacts with and dissolves the magnesium oxide according to the reaction:

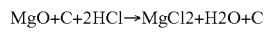

$$MgO+C+2HCl \rightarrow MgCl2+H2O+C$$

Optionally, buffers or additional reagents may be used. The magnesium chloride salts readily dissolve in water, leaving only the graphene and other carbon compounds as solids. These carbon solids are then washed with the ionized water. The graphene and other carbon compounds may then be separated from the magnesium chloride solution using any of a number of well-known techniques for removing a solid and/or precipitate from a solution.

Figure 3:
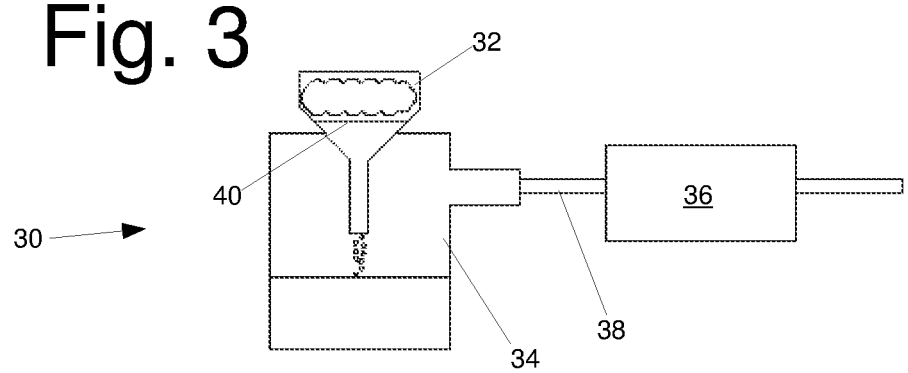
FIG. 3 is a cross-sectional view of a suction filtration device in accordance with the principles of the invention.

FIG. 3 shows an exemplary suction filtration device 30 four removing solids from a liquid. The filtration device 30 includes a funnel separator 32, a liquid collection flask 34 and a suction pump 36 connected to the collection flask 34 by a conduit 38. The funnel separator 32 includes a filter 40 permeable by an aqueous solution but impermeable to graphene. The reactant mixture 42 is placed within the funnel separator 32 and vacuum is applied to the collection flask 34. The suction removes the water-soluble products of the ignition reaction, leaving only the solid carbon products within the funnel separator 32 above the filter 40. Those skilled in the art will appreciate that the graphene within the funnel separator 32 may be washed several times with an aqueous solution or other solutions to remove other contaminants and/or undesirable additional byproducts. When the separation is complete, the carbon products are removed from the funnel separator 32. Those skilled in the art will appreciate that there are numerous other techniques that may be used in accordance with the principles of the invention to remove graphene flakes from a liquid, such as centrifugation. At this point, the other reduced carbon products are still present with the graphene.

Figure 4:
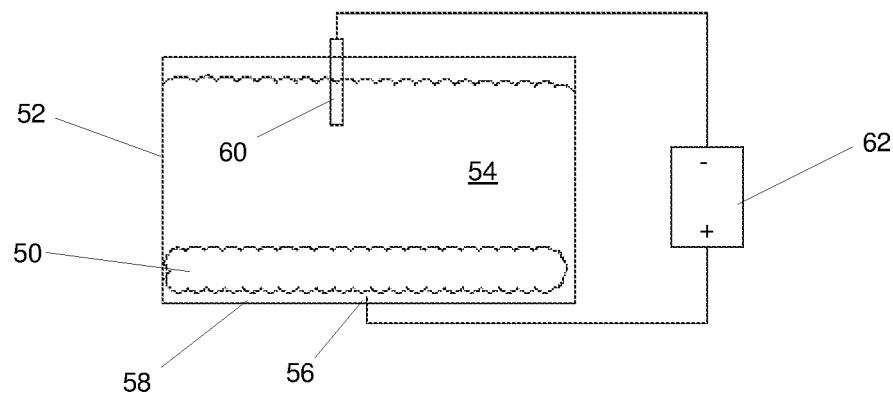
FIG. 4 is a cross-sectional view of an exfoliation chamber in accordance with the principles of the invention.

The majority of the graphene produced by the above described magnesium reduction is un-exfoliated, i.e. comprised of several layers stacked together. FIG. 4 shows an electrolytic graphene exfoliation method to separate the graphene into single layer flakes. The un-exfoliated graphene 50 obtained from washing and rinsing the carbon reaction products above is suspended in an ammonium sulfate solution 54 in an exfoliation chamber 52. Optionally, the ammonium sulfate solution 54 may be stirred throughout this step to maintain the graphene 50 in suspension and prevent the graphene 50 from adhering to the electrodes or another surface. The exfoliation chamber 52 has an anode 56 at the bottom 58 of the chamber 52, and a cathode 60 at the top of the chamber 52 which is in contact with the ammonium sulfate solution 54. In this embodiment, the solution 54 is an aqueous 0.1 M ammonium sulfate solution having a pH between 6.5 and 7. Optionally, the aqueous ammonium sulfate solution may be 0.5 M, 1 M or 5 M. a direct current of about 10 V is applied from a DC power source 62 for at least five minutes.

The graphene 50 is then removed from the ammonium sulfate solution using suction filtration as described above or other methods known in the art. The graphene 50 may also optionally be desiccated to remove moisture.

Figure 5:
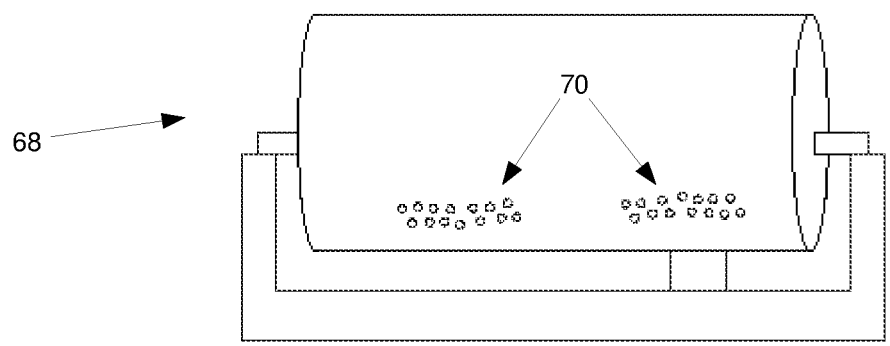
FIG. 5 is a diagram of a tumble blender in accordance with the principles of the invention.

The dried graphene is then placed in a tumble blender 68, as shown in FIG. 5, and tumbled for 1-24 hours. This step further exfoliates the graphene 50. Optionally, mechanical vibration and/or sonication may be used in addition to or in place of the tumble blending step. The graphene 50 is now substantially exfoliated. However, the single layer graphene flakes 70 are generally relatively small.

Figure 6:
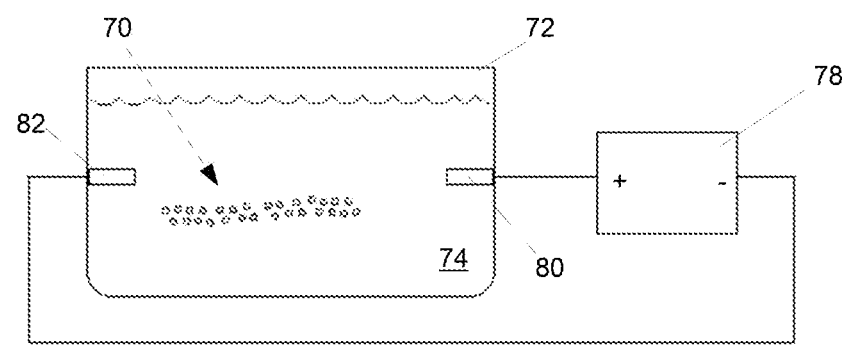
FIG. 6 is a cross-sectional view of a graphene sheet growth chamber in accordance with the principles of the invention.

In order to grow the graphene into larger graphene flakes, a second electrolytic step is performed. FIG. 6 shows a graphene sheet growth chamber 72 filled with ethanol 74. The exfoliated graphene flakes 70 are placed within the graphene sheet growth chamber 72 and suspended in the ethanol 74. A power source 78, such as for example a battery, supplies an electric current to the growth chamber 72 through an anode 80 and a cathode 82. This electrolysis causes the graphene flakes 70 to grow into larger graphene sheets. As with the exfoliation step shown in FIG. 4, the suspension may be stirred to prevent the graphene flakes 70 from adhering to the electrodes or other surfaces. In this embodiment, a current of about 1 volt was applied for at least 15 minutes. The dimensions of the formed graphene sheets depend in part upon the type of current applied and the length of time over which the current is applied. Once the graphene sheets achieve desirable size, the graphene sheets are separated from the ethanol 74 using suction filtration or other method known in the art.

The produced graphene sheets may then be used in the production of any of a variety of products. For example: inserted as a substrate admixture for concrete, as a water filtration medium, as the properties of the molecule allow it to be a natural sieve to separate dissolved and undissolved particles from water, as an air filtration medium, as the properties of the molecule allow it to be a natural sieve to separate organic and inorganic particles from air, as a replacement to the separator in batteries, allowing for a battery-capacitor hybrid; compacted and used as capacitors for electronics, arranged in such a way that may improve or replace materials used for circuit pathways in circuit boards, used as insulating materials to create additives for thermal insulation; integrated into clothing to increase material strength and insulation capabilities, integrated into aerogels to increase and improve the thermal insulation and capabilities of said gels, integrated into electrical safety equipment, as its high electrical resistance will absorb high electrical currents, used with electrical insulating materials to create electrical resistors, compacted with resins to create radiation resistant mediums, compacted with silicon glass to create solar panel replacements, compacted with silicon glass to create photodiodes, added as an additive to glass for increased strength, added to a metal alloy for increased strength and enhance the properties of its metal, integrated into lightbulbs by acting as a replacement for the resistor, integrated as sound barriers to create a speaker, integrated as a fiberglass additive to increase its strength and flexibility, integrated as a carbon fiber additive to increase its strength and flexibility, integrated as an additive for plastic to increase its strength and flexibility, integrated as an additive for plexiglass to increase its strength and flexibility, integrated into armor materials such as, but not limited to, Kevlar® for improved strength, integrated into polymers including but not limited to polyester, polystyrene, polycarbonate, and polyurethane to increase their strength and flexibility, integrated into solid materials including but not limited to stone, ceramic, marble, and tile to improve the material's properties.

Whereas, the present invention has been described in relation to the drawings attached hereto, it should be understood that other and further modifications, apart from those shown or suggested herein, may be made within the spirit and scope of this invention. Descriptions of the embodiments shown in the drawings should not be construed as limiting or defining the ordinary and plain meanings of the terms of the claims unless such is explicitly indicated. Those skilled in the art will appreciate that the conception, upon which this disclosure is based, may readily be utilized as a basis for the designing of other structures, methods and systems for practicing the present invention. It is important, therefore, that the claims be regarded as including such equivalent constructions insofar as they do not depart from the spirit and scope of the present invention.

The invention claimed is:

1. A method for synthesizing graphene flakes from atmospheric carbon dioxide gas comprising:
    capturing atmospheric carbon dioxide;
    igniting magnesium in the presence of the carbon dioxide to produce graphene;
    washing the graphene with aqueous hydrochloric acid;
    rinsing the graphene flakes with deionized water;
    suspending the graphene flakes in an aqueous ammonium sulfate solution;
    exposing the ammonium sulfate solution to an electric current of about 10 volts for at least five minutes;
    separating the graphene flakes from the ammonium sulfate solution;
    desiccating the graphene flakes;
    tumbling the graphene flakes in a tumble blender for 1 to 24 hours;
    suspending graphene flakes in an ethanol solution; and,
    applying a current of 0.5 to 1.5 V to the ethanol solution.

2. The method for synthesizing graphene flakes from atmospheric carbon dioxide gas of claim 1 wherein the capturing the atmospheric carbon dioxide comprises:
    cooling atmospheric air to about −10° C.;
    saturating an aqueous monoethanolamine solution with carbon dioxide by aerating the aqueous monoethanolamine solution with the cooled atmospheric air at a low temperature;
    collecting the carbon dioxide by heating the aqueous monoethanolamine solution.

3. The method for synthesizing graphene flakes from atmospheric carbon dioxide gas of claim 1 wherein the capturing the atmospheric carbon dioxide comprises cooling atmospheric air to about −56° C.

4. The method for synthesizing graphene flakes from atmospheric carbon dioxide gas of claim 1 wherein the capturing the atmospheric carbon dioxide comprises cooling atmospheric air to about −78° C.

5. The method for synthesizing graphene flakes from atmospheric carbon dioxide gas of claim 1 wherein the aqueous ammonium sulfate solution is 0.1 M ammonium sulfate.

6. The method for synthesizing graphene flakes from atmospheric carbon dioxide gas of claim 1 wherein the aqueous ammonium sulfate solution is 0.5 M ammonium sulfate.

7. The method for synthesizing graphene flakes from atmospheric carbon dioxide gas of claim 1 wherein the aqueous ammonium sulfate solution is 1 M ammonium sulfate.

8. The method for synthesizing graphene flakes from atmospheric carbon dioxide gas of claim 1 wherein the aqueous ammonium sulfate solution is 5 M ammonium sulfate.

* * * * *